Feb. 6, 1968  A. K. LITTWIN  3,368,119
APPARATUS FOR DEMAGNETIZING
Filed May 1, 1963  3 Sheets-Sheet 3
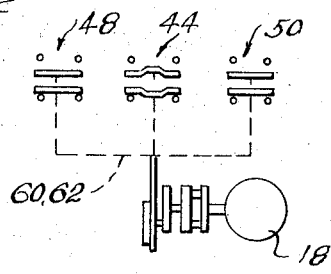
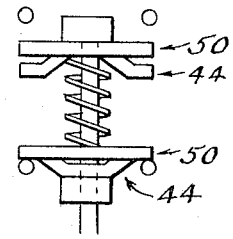
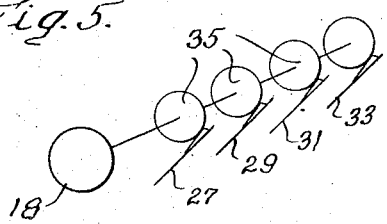
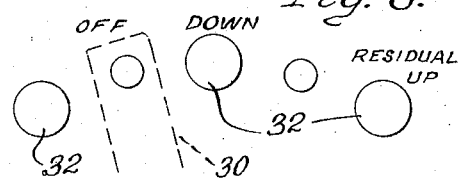
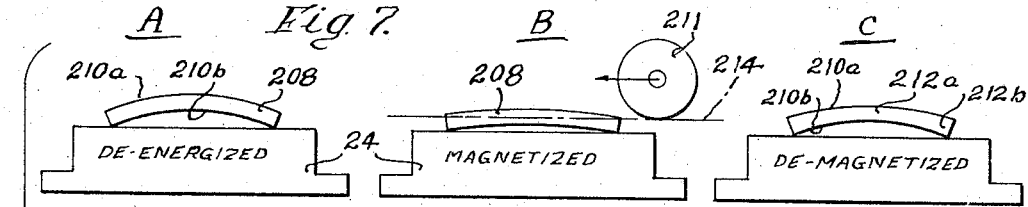
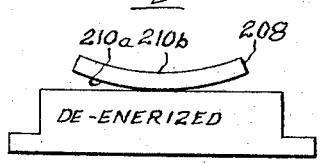
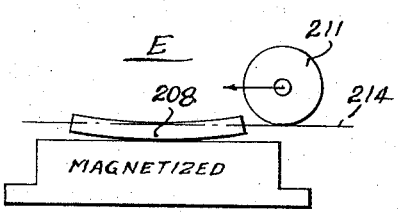
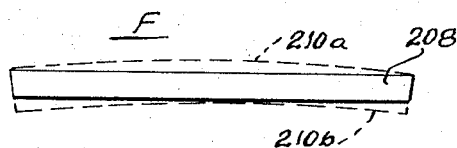
Inventor:
Arthur K. Littwin
By Horton, Davis, Brewer &
Bruqman Attys.

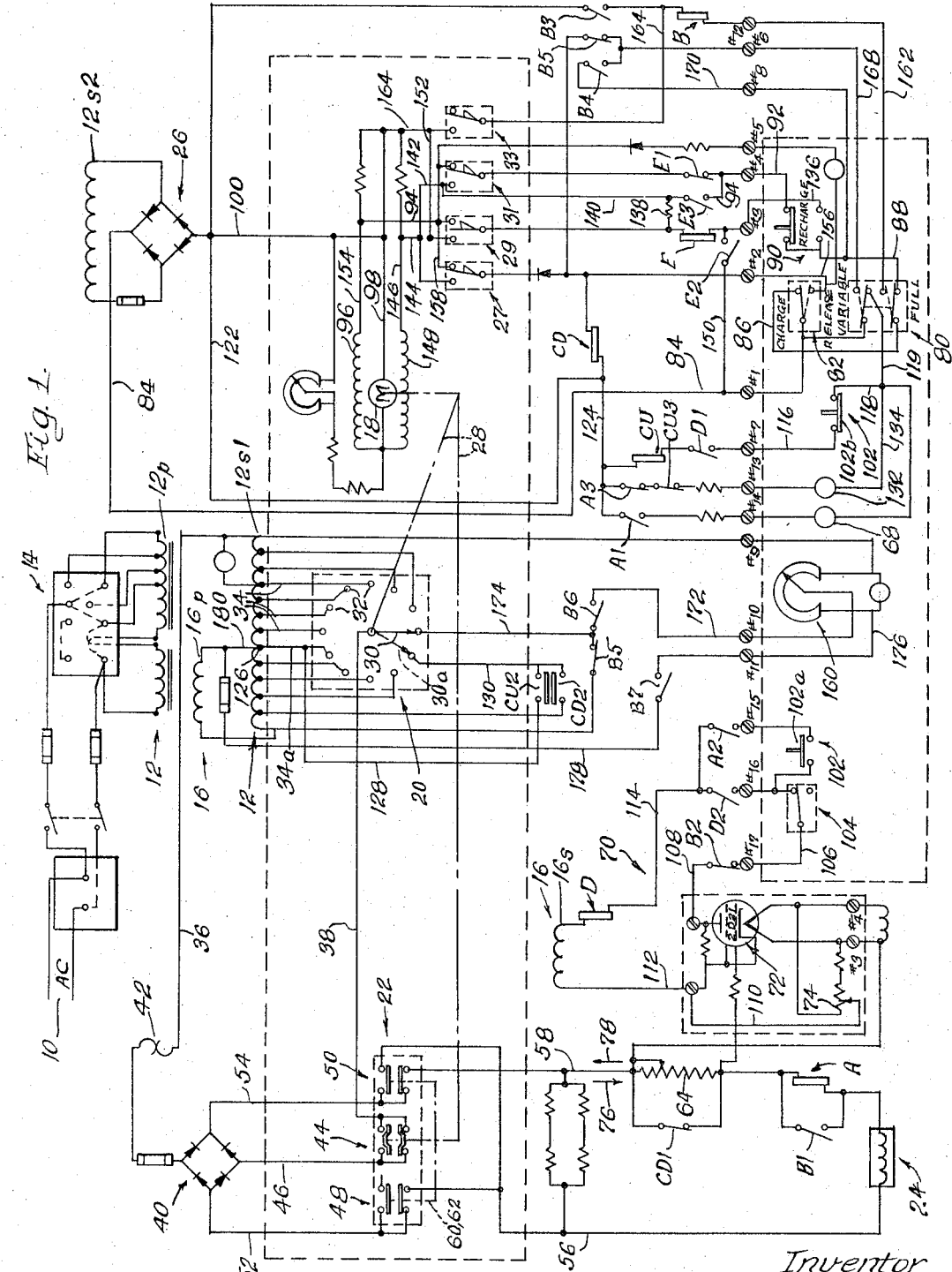

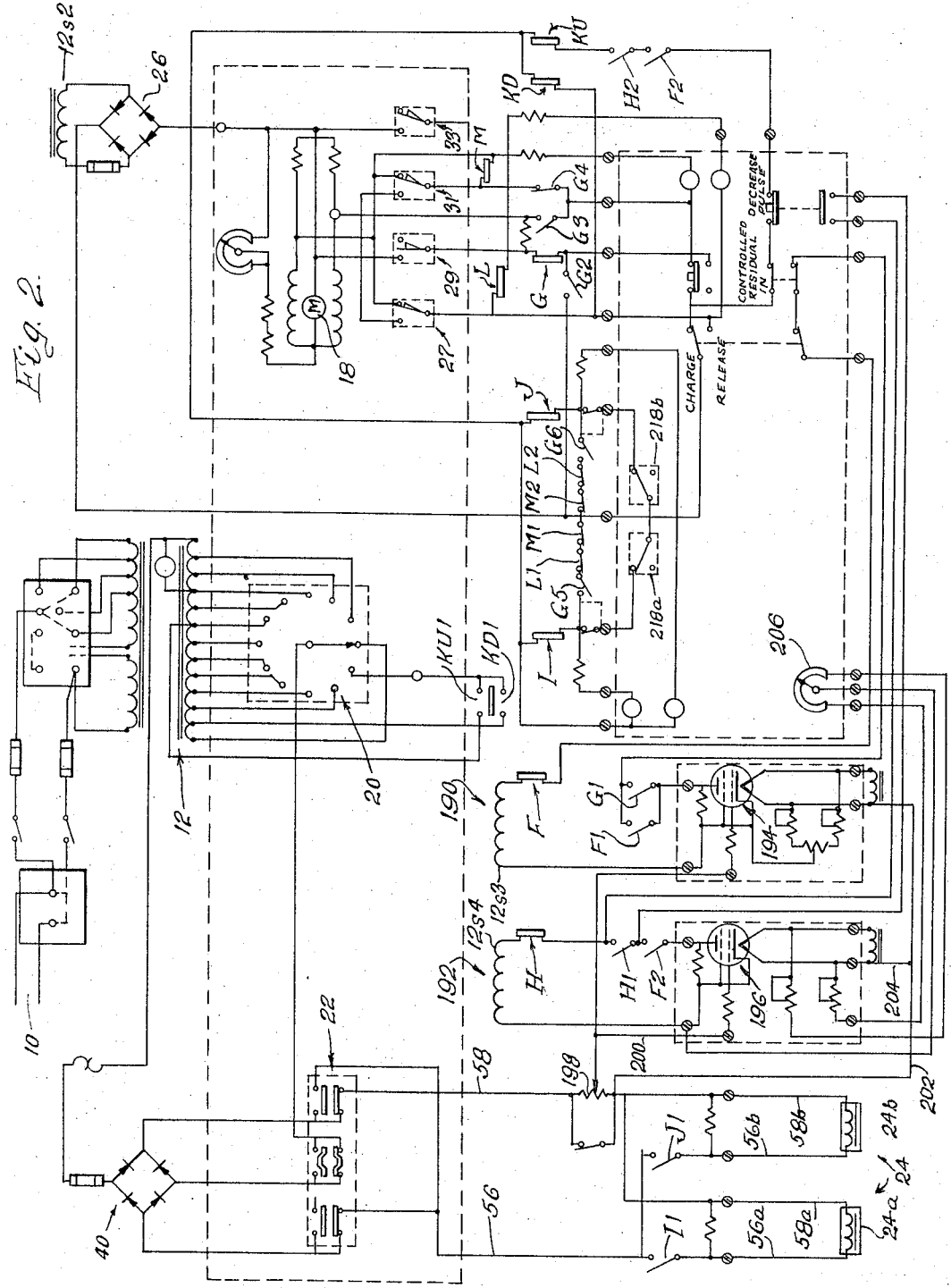

United States Patent Office 3,368,119
Patented Feb. 6, 1968

3,368,119
APPARATUS FOR DEMAGNETIZING
Arthur K. Littwin, Lincolnwood, Ill., assignor to Arthur K. Littwin, Robert L. Littwin, Donald F. Littwin, and Horace A. Young, all of Chicago, Ill., as trustees under trust dated Jan. 2, 1951, known as Littwin Family Trust No. 1
Filed May 1, 1963, Ser. No. 277,253
20 Claims. (Cl. 317—157.5)

The present invention relates to apparatus for and method of demagnetizing.

The invention relates additionally to controlled remagnetizing in conjunction with demagnetizing operations.

The invention has particular adaptation to such installations as machine tools, in which a workpiece being worked on is held on a chuck by magnetism. In order to remove the workpiece from the chuck it is, of course, necessary to demagnetize the chuck. However, in the overall operation of performing a work operation on a workpiece, it may become necessary, in addition to simply demagnetizing the chuck and workpiece, to partially demagnetize, and again remagnetize them, as when it is desired remove the workpiece for checking it, or checking the operation thereon, or for other reasons.

A broad object, therefore, of the present invention is to provide apparatus for and method of demagnetizing, and controlled remagnetizing in conjunction therewith.

A further object of the invention is to provide apparatus of the foregoing character particularly adapted for use with a permanent magnet chuck which may be demagnetized and again remagnetized under the control of the apparatus, and when magnetized remains effective for holding the workpiece when the magnetizing force is disconnected.

A further object is to provide apparatus of the foregoing character in conjunction with a permanent magnet chuck utilizing novel signal means for indicating the charged condition of the chuck, upon disconnection of the magnetizing force, at any degree of magnetization which may be selected by the operator thereof.

Another object is to provide apparatus of the foregoing general character wherein a workpiece may be demagnetized to a selected and controlled degree relative to full magnetization.

Still another object of the invention is to provide apparatus in the foregoing general character which includes an arrangement for demagnetizing in individually controlled steps whereby to enable a work operation on a workpiece after each such demagnetizing step, to thereby enable accurate finishing of the workpiece in a manner to overcome possible distortion thereof due to secure holding of the workpiece on the chuck by full or greater magnetization.

A still further object is to provide apparatus of the foregoing general character incorporating a novel arrangement whereby a plurality of chucks can be individually accommodated by a single demagnetizing and remagnetizing apparatus.

Another object is to provide magnetizing and demagnetizing apparatus, including cycling means operative selectively for magnetizing a chuck to full magnetization level or a lesser controllably adjustable level, for producing steady reverse current to demagnetize the chuck to a predetermined lesser level of magnetization, and for demagnetizing the chuck in a series of steps of successively reverse currents to a level near zero, each according to a predetermined law of operation.

Other objects and advantages of the invention will appear from the following detailed description taken in conjunction with the accompanying drawings in which:

FIG. 1 is an electrical diagram of the circuit utilized in one form of the invention;

FIG. 2 is an electrical diagram of the circuit utilized in another form of the invention;

FIG. 3 is a detail view of switching mechanism utilized in this apparatus;

FIG. 4 is a detail view of switch means illustrated in FIG. 3;

FIG. 5 is a diagrammatic view illustrating motor and cam means;

FIG. 6 is a fragmentary illustration of certain control switch positions; and

FIG. 7 is a diagrammatic view, greatly exaggerated, showing certain steps in a working operation on a workpiece.

Referring now in detail to the drawings, attention is directed first to FIG. 1, illustrating the electrical circuit utilized in one form of the invention. In this circuit diagram, an A.C. source is indicated at 10, with lines leading to a transformer 12 through a tapped terminal strip 14, for providing selective voltage connections to the primary 12p of a transformer 12. Preferably the primary 12p includes two separate coils which may be connected in circuit selectively or together. The transformer 12 also includes two secondaries 12s1 and 12s2. Connected across a portion of the secondary 12s1 is another transformer 16, which includes a primary 16p and a secondary 16s.

The apparatus of FIG. 1 includes portions of the kind of demagnetizing apparatus disclosed and claimed in my prior Patent No. 2,825,854, dated Mar. 4, 1958, and includes the broad concept of an A.C. source, converting the A.C. to D.C., and transmitting it to the electromagnet, interrupting the A.C., and while the A.C. is interrupted, reversing the D.C., and at each reversal reducing the voltage applied to the electromagnet. In the apparatus disclosed in FIG. 1, the main components of the apparatus just referred to include a motor 18, a rotary tap switch 20, and switching mechanism 22 driven by the motor; the magnetic chuck is indicated at 24 which, as referred to again hereinbelow, is of the permanent magnet type.

Referring to the various components of the circuit of FIG. 1 individually, the motor 18 is driven from the secondary 12s2, through a rectifier 26 and other elements to be referred to hereinbelow. The motor is associated with and controlled by a plurality of limit switches 27, 29, 31 and 33 (see also FIG. 5) actuated by corresponding cams 35 driven by the motor, in conjunction with the operation of other portions of the circuit, to be described more fully hereinafter. The connection between the motor 18 and the rotary tap switch 20, indicated diagrammatically at 28, may be of any suitable arrangement, such as disclosed in my prior patent referred to above.

The rotary tap switch 20 includes an arm 30 driven by the motor 18, successively engageable with contact terminals 32 arranged in a circular series. The arm 30 is arranged for moving off of each contact terminal to a space between adjacent terminals to an OFF position, and thereafter onto the next contact terminal. The contact terminals 32 are connected with individual tappings of the secondary 12s1 through respective conductors 34 for producing different voltage values and applying them to the chuck 24 in a demagnetizing operation.

Conductors 36 and 38 lead from the secondary 12s1 to a rectifier 40 for converting the A.C. to D.C., which thereupon is transmitted to the magnet in the chuck; the conductor 36 is connected directly with one end of the secondary and leads through a fuse 42 to one junction of the rectifier, while the other conductor 38 leads from the arm 30 of the rotary tap switch 20 through an A.C. interrupting switch 44 and through conductor 46 to the opposite junction of the rectifier. The switch 44 is incorporated in the switching means 22 referred to above, which also includes reversing switches 48 and 50 connected respectively to conductors 52 and 54 which are connected at opposite center junctions of the rectifier. Conductors 56 and 58 lead from the reversing switches to the chuck 24.

The A.C. interrupting switch 44 and the two reversing switches 48 and 50 are operated in unison, as indicated in FIGS. 3 and 4 and as described more fully in my prior patent mentioned. The three switches are so operated by switching bars 60 and 62 on opposite sides of the two banks of switches. The contactor bars of the A.C. operating switch 44 are specially shaped so as to move in a sequence different from those of the reversing switches, so that a make-before-break action is accomplished, i.e., the A.C. is interrupted, then the D.C. circuit is established, on both sides of the reversing switches, then the D.C. is interrupted at the first contacts, and thereafter the A.C. is re-established. The switching means 22, as will be understood, is operated in synchronism with the rotary tap switch 20 to accomplish the result just stated, and with the further refinement that the A.C. interrupting switch 44 is actuated before the switch arm 30 moves off each contact terminal 32, and again re-establishes the A.C. circuit before that arm moves onto the next contact terminal. The motor 18 operates through a complete pre-determined cycle in a demagnetizing operation, after the operation thereof is initiated by the manual control of the operator, in which the magnetization of the chuck is reduced to zero, or nearly zero.

A relay A has its coil connected in the conductor 58, and adapted to be shunted by a relay switch B1. Also connected in the conductor 58 is a potentiometer or adjustable resistor 64, adapted to be shunted by relay switch CD1.

The relay A is of a permanent magnet type, of known kind, wherein upon energization thereof, as by a current in the conductor 58, the switches thereof are thrown to their abnormal position by the energized magnet, and are so retained upon cessation of that current, and are not moved to their normal position until the magnet is demagnetized. Upon energization of the magnetic chuck 24, the relay A is thus actuated, closing switch A1 and turning on a signal light 68 (red) to indicate that fact. Thereafter, the circuit to the chuck is opened, in a manner described hereinbelow, since it is desired not to retain the circuit closed thereto, because of the permanent magnet characteristics of the chuck. However, in the present instance, even after the circuit to the chuck is opened, the chuck remains magnetized until it is controllably demagnetized, and the signal light 68 also remains on until the relay A is demagnetized, which is done in the same operation in which the chuck is demagnetized.

Additional control is exerted on the chuck through a unit indicated in its entirety at 70, and which includes a 2D21 tube 72. The operation of this unit 70 in the present instance is similar to the disclosed and claimed in my prior Patent No. 3,045,151, dated July 17, 1962, to which reference may be had for greater detail thereof. The unit 70 is utilized for effecting or controlling RESIDUAL, or partial demagnetization of the chuck. The tube 72 is preferably maintained constantly in conducting condition, through an adjustable resistor 74 which effects the imposition of a positive bias on the tube. The adjustable resistor 64 in the conductor 58 is arranged for impressing a controlling bias on the tube to render it non-conducting upon a predetermined condition, such as a reverse current in the conductor 58. Specifically, the latter control operation is produced by a negative current signal produced in the conductor 58 in a demagnetizing operation. Assuming a positive current indicated by the arrow 76 utilized for energizing the chuck (when the switch CD1 is closed), upon a demagnetizing current in the opposite direction indicated by the arrow 78 being established (with the switch CD1 then open), the desired negative signal is produced and imposed on the tube 72. This reverse direction current builds up at a certain rate, and upon the magnetization of the chuck decreasing to the desired level according to the setting of the adjustable resistor 64 and consequent development of a signal by that current, the signal effects extinguishing of the tube 72 and opening of the circuit is controlled thereby. This opening of the circuit is effected through de-energization of the D relay coil resulting in control functions in other portions of the circuit.

As an initial step in the operation of the apparatus, it is first actuated to charge or energize the chuck 24 to hold a workpiece thereon. To do so, the VARIABLE-FULL switch 80 is set to FULL position, and the CHARGE-RELEASE switch 82 is set to CHARGE position; a circuit is then completed as follows: conductor 84 from one center junction of the rectifier 26, the switch 82, conductor 86, the switch 80, conductor 88, the upper contacts of a RECHARGE switch 90, conductor 92, switch E1 of relay E, limit switch 31, conductor 94, through the forward field coil 96 of the motor 18, conductors 98 and 100 to the opposite center junction of the rectifier 26. The motor is then driven to move the switch 20 from an OFF position indicated in FIG. 6, to an ON position and then to a RESIDUAL position. In the latter position, the switch 20 is in circuit closing position, as are all of the components of the switching means 22, and as a consequence charging or energizing current is impressed on the chuck 24.

The circuit to the chuck established by the foregoing step just described is interrupted shortly after its completion and consequent full charging of the chuck, through the limit switch 31, the cam controlling this switch being so set that it opens the switch after the desired predetermined interval and at such position of the motor and rotary tap switch 20 that the arm 30 of the latter is in an OFF position between active contact terminals 32 (FIG. 6) and with the A.C. interrupter switch 44 open. Although the switch 44 interrupts the circuit to the chuck, the relay A coil remains energized because of its permanent magnet nature, as described above.

As indicated above, it is often desired to remove one or more workpieces from the chuck, to check it or to check the operation being performed thereon, or for other reasons. In such case it is desired not to completely demagnetize the chuck, as through a complete demagnetizing cycle, but to reduce the magnetization to a desired degree, usually greater than zero, and this preferably by a quick operation. This can be effectively accomplished in the use of the present invention by the RESIDUAL control, consisting chiefly of the unit 70 which operates to impose a reverse current on the chuck until the magnetization decreases to the desired level.

To perform this operation, the operator actuates the RESIDUAL push button 102, which includes two switches 102a and 102b. Upon depression of the push button 102, and particularly upon closure of switch 102a thereof in the unit 70, a circuit is completed through the circuit of unit 70 as follows: beginning with the residual switch 102a, through the switch 104, conductor 106, switch B2, conductor 108, the tube 72, the adjustable resistor 74, conductors 110 and 112, and secondary 16s, the relay D coil, conductor 114, switch A2 in return to the residual switch 102a. It will be recalled that at this time the switch A2 is closed due to the energization of the A coil in response to the energization of the chuck. The circuit of the unit 70 is retained through switch D2.

Energization of the D relay coil, and consequent closure of switch D1, energizes the CU relay coil in the following circuit: beginning with switch D1, conductor 116, switch 102b, conductors 118 and 119, switch 80, conductor 120 and conductor 84 to one junction of the rectifier 26; the circuit continues from the opposite junction to conductor 122, conductor 124 through the CU coil and in return to the switch D1. Energization of the CU coil closes the switch CU2; and imposes a current in the reverse direction on the chuck, the arm 30 of the rotary tap switch 20 being at this time in the RESIDUAL position, indicated at 30a in dotted lines, and the reversing switches 48 and 50 being in such position as to impose a current on the chuck opposite that at which it was charged; the circuit thus set up to the magnetic chuck is as follows: from tapping 126 of the secondary 12s1, the associated conductor 34a, conductor 128, the switch CU2, conductor 130 to the contactor arm 30, thus completing the circuit to the rectifier 40 as described above, and of course completion of the D.C. circuit to the chuck. This reverse current as controlled through the adjustable resistor 64 produces the signal, as described above, which extinguishes the tube 72 and opens the circuit of the unit 70, de-energizing the D relay coil, as a result of which the CU relay coil is de-energized, opening the switch CU2 and interrupting the circuit to the chuck. The reverse current flowing through the A relay coil also demagnetizes this coil and de-energizes this relay, opening switch A1 and turning off the signal light 68. De-energization of the A relay coil closes the switch A3 and turns on a signal light 132 (white). The circuit to this light is: beginning with switch A3, conductors 124 and 122 to one junction of the rectifier 26; the circuit continues through the opposite junction of the rectifier through conductor 84, through the switch 82, conductor 120, switch 80, conductors 119 and 134, through the light 132, through the normally closed switch CU3, and in return to the switch A3.

In this RESIDUAL operation, it is desired that there be at least some magnetization in the chuck in order to retain the workpieces in position thereon, and not risk accidental displacement of them, since in many if not in most instances, the working operation is to be continued, and it is desired that the workpieces that are not removed remain in their original positions. The control unit 70 thus serves as a means for quickly demagnetizing the chuck and workpieces to the desired degree of magnetization without, however, in all cases, and as desired, reducing that magnetization to zero, and without the necessity for a full cycling operation of the demagnetizing portion of the apparatus which includes the rotary tap switch 20, switching means 22, etc.

After the above RESIDUAL operation is performed, and when it is desired to return the apparatus again to full power condition, the RECHARGE switch 90 is depressed, closing the contacts at the bottom thereof; this completes the circuit as follows: beginning with the switch 90 itself, conductor 88, the switch 80, conductor 86, switch 82, conductor 84 to one junction of the rectifier 26; in the other direction from the switch 90 the circuit continues through conductor 136, relay E coil, resistor 138, conductors 140, 142, 144 and 146 to the reverse field coil 148 of the motor 18; the circuit then continues through conductors 98 and 100 to the opposite junction of the rectifier 26.

Upon energization of the E coil in the circuit just referred to, the switch E2 is closed, and a retaining circuit is set up as follows: beginning with the switch E2, conductors 150 and 84 to one junction of the rectifier 26; and in the opposite direction through the E coil and the remainder of the circuit as just described, namely, resistor 138, conductors 140, 142, 144 and 146 to the reverse field 148 of the motor and continuing through conductors 98 and 100 to the rectifier 26. Also, when the E coil is energized, it completes a circuit through the holding switch E2, as follows: beginning from the switch E2, the circuit in one direction is through conductors 150 and 84 to the switch 82, conductor 86 to the switch 80, conductor 88, the upper contacts of the switch 90, conductors 92 and 94, abnormally closed switch E3, conductors 140, 142, 144 and 146 to the reverse field coil 148 of the motor, and continuing through conductors 98 and 100 to the opposite junction of the rectifier 26. This circuit operates the motor 18 to the full-on power position, and when that position is reached, the chuck is again charged as previously described, the circuit then being interrupted by movement of the limit switch 29 to an OFF position de-energizing the E relay coil, this control of the motor being through the corresponding cam 35. Thereafter, the motor is then reversed, and run to the residual position through the following circuit: conductor 84 from one junction of the rectifier the switch 82, conductor 86, the switch 80, conductor 88, the upper contacts of the switch 90, conductor 92, normally closed switch E1 and the limit switch 31; the circuit continues through conductors 150, 94 and 152 to the forward field coil 96, and then through conductors 98 and 100 to the opposite junction of the rectifier 26. This runs the motor until it reaches the RESIDUAL position in which the limit switch 31 reaches an intermediate off position.

When the operation on the workpiece is completed, and it is desired to remove it from the chuck, the chuck and workpieces are demagnetized completely, or to a condition near zero magnetization. To demagnetize, the switch 82 is thrown to RELEASE position shown in dotted lines. A circuit is then completed, as follows: from one junction of the rectifier 26 through conductor 84, the switch 82, conductor 156 to the limit switch 27, and continuing through conductors 158, 94 and 154 to the forward field coil 96 of the motor and then through conductors 98 and 100 to the opposite junction of the rectifier 26. The motor is then run in forward direction, driving the rotary tap switch 20 through a full demagnetizing cycle as set out in detail in my prior Patent No. 2,825,854 referred to above, the cycle terminating when the limit switch 27 is opened, under the control of the corresponding cam 35, the switch coming to rest in an intermediate position, de-energizing the motor. In this demagnetizing operation, the motor stops at such position that the arm 30 of the rotary tap switch 20 is in an OFF position (FIG. 6) between contact terminals 32, and the A.C. interrupter switch 44 is open.

The apparatus also provides for a variable holding power condition, in which the magnetization of the chuck is substantial, but less than full power of which the apparatus is capable of producing. This may be useful in an instance in which, for example, it is desired to hold a workpiece on the chuck with less than full power so as not to distort the piece. Instances occur in which workpieces may be distorted by the holding force of the chuck, provided by the full capacity power of the apparatus. This variable, or lesser, holding power is controlled through the use of a variable auto transformer 160, which is set to the desired position manually, for producing a holding power less than maximum. After setting this auto transformer, the CHARGE-RELEASE switch 82 is moved to CHARGE position, and the VARIABLE-FULL switch 80 moved to VARIABLE position shown in dotted lines. These settings produce the following circuit: from one junction of the rectifier 26 through conductor 84, the switch 82, conductor 86, through the switch 80, conductor 162, relay B coil, conductor 164, and through limit switch 33 which is then in the position opposite that shown; the circuit then continues through conductors 164 and 154 to the forward field coil of the motor 18, and then through conductors 98 and 100 to the rectifier. The relay B coil energized by this circuit closes a holding switch B3; a circuit is also completed from conductor 84 through conductor 166, and through the switch 80 to conductor 168, abnormally closed switch B4, conductor 170, through conductor 88, and the upper contacts of the switch 90, conductor 92, switch E1 and through the limit switch 31; the circuit then continues through conductors 152, 194 and 154 to the forward field coil 96 of the motor and through conductors 98 and 100 to the rectifier. The motor is then run in forward direction to a FULL power position in the manner described above, but producing a value of magnetization as determined by the setting of the variable auto transformer 160. This auto transformer is connected in the A.C. circuit through the rotary tap switch 20 as follows: from the auto transformer, conductor 172, abnormally closed switch B6, conductor 174, rotary tap switch 20, conductor 38, A.C. interrupter switch 44, and conductor 46 to one junction of the rectifier 40; the circuit continues in the other direction from the auto transformer through conductor 176, abnormally closed switch B7, conductor 178, conductor 180, the transformer secondary 12s1 and conductor 36 to the opposite junction of the rectifier 40.

The motor continues to run in this VARIABLE setting operation until the circuit is opened by the corresponding limit switch 27, which is controlled by the corresponding cam 35 in the same full power sequence as described above, with the exception that the power applied to the chuck is at a lesser value, and proportionate to the setting of the variable auto transformer 160.

If more power is required, i.e., greater value of magnetization of the chuck, the variable auto transformer 160 is set at the appropriate higher setting and the switch 90 is again actuated; the apparatus will then operate through the sequence just described. If after a first or any subsequent VARIABLE setting it is desired to have full power applied, the switch 80 is thrown to FULL position, and the switch 90 actuated; the chuck will then be charged at full power, as in the case when it is to be charged from a zero magnetization condition. When it is desired to demagnetize the chuck from a VARIABLE condition, the switch 82 is thrown to the RELEASE position, as in the case of FULL power condition, and the demagnetizing cycle is performed.

Attention is now directed to FIG. 2, showing a circuit diagram of a modified form of the invention. The present circuit includes certain of the same components incorporated in the circuit of FIG. 1, and identified herein in the same manner, as follows: the A.C. source 10, transformer 12, motor 18, rotary tap switch 20, switching means 22, rectifier 40 and chuck means 24 which in the present instance includes a plurality of, or two, chucks 24a and 24b. The conductors leading from the switch means 22 to the chuck means include the conductors 56 and 58 identified in the first embodiment, but here having branch portions 56a and 56b and 58a and 58b, respectively, leading to the individual chucks. Associated with the motor 18 are the limit switches 27, 29, 31 and 33, identified above. Other portions of the present circuit correspond to similar portions of the circuit in the first embodiment, as will be observed.

The present form of the control apparatus includes RESIDUAL units 190 and 192, including 2D21 tubes 194 and 196 respectively. These two units are similar in operation to the unit 70 in that they interrupt the circuit to the chuck means in response to decrease of the magnetization in the chuck means in a partial demagnetizing or RESIDUAL demagnetization, under controlled conditions, according to a pre-determined manual setting.

The RESIDUAL control unit 190, considered the "base" unit, includes a relay F coil, and a holding switch F1, there being an associated switch F2 in the unit 192. The circuit of this unit also includes a switch G1 controlled by a G relay coil in the RECHARGE circuit portion and corresponding to the relay E in the first modification.

In the D.C. conductor 58 leading to the chuck means is a variable resistor 198 similar in function to the corresponding component 64 in the first modification, for imposing a controlling bias on the tubes 194 and 196. Upon reverse current flowing in the conductor 58, a negative signal is produced and imposed on the tube (194) to open the circiut of that unit (190). Upon the F coil becoming thus de-energized, the switch F2 opens, the KU coil is de-energized with consequent opening of switch KU1, and opening of the circuit to the chuck. This unit may be set by adjusting the adjustable resistor 198 to the desired setting for interrupting the circuit to the chuck means at a pre-determined level of magnetization thereof when it is desired, for example, to partially demagnetize th workpieces to remove one or more of them for test purposes, as explained above.

The unit 192 may be referred to as an auxiliary unit which operates within the base range established by the unit 190. This unit includes a relay H coil and a holding switch H1, the H coil cotrolling a corresponding switch H2. The unit 192 has particular adaptation to a machine tool in conjunction with an operation of the following character: it often occurs that a workpiece is distorted when placed on a magnetic chuck and held thereon by a large magnetic force, due to any of various reasons, such, for example, as an irregular shape of the piece. When such a piece is held on the chuck by a large magnetization force, and so distorted, and a working operation performed thereon, such as a grinding operation, the desired surface, such as a flat surface, is apparently produced on the piece, but this is only when considered relative to its condition under full magnetization holding effect and when the piece is released from the chuck by removal of the magnetization force, it assumes, or tends to assume, its original shape, and in doing so, the surface that was regarded as a flat surface when the workpiece was held on the chuck changes to an irregular or non-flat surface. This difficulty is not easily overcome, because such large value of magnetization as may distort the piece is necessary to hold the piece on the chuck sufficiently securely for the working operation, and if it were held with less force, it may be moved by the operating instrumentality, such as the grinding wheel. I have overcome this difficulty by providing the unit 192, by means of which the workpiece can be held in place in successive steps by progressively diminished magnetization force, and the working operation performed thereon in successive steps may involve less operating power.

The signal developed in the adjustable resistor 198 is also imposed on the tube 196, through the conductors 200, 202 and 204, but this signal is controlled by a manually settable potentiometer 206. The control 206, acting through the circuit of the unit 192, including the secondary 12s4, controls the effectiveness of the signal produced by the adjustable resistor, so that the unit 192 interrupts the circuit according to the setting of the potentiometer 206, which is at a level of magnetization less than that which controls the unit 190. The signal causes opening of the circuit of the unit, thereby de-energizing the H coil, opening the switch H2, de-energizing the KU coil, and opening the switch KU1 with consequent opening of the circuit to the chuck. The effectiveness of the unit 192 may be realized from an operation such as the following: a workpiece that may be distorted is placed on the chuck and held thereon by full magnetization force; it is then ground; the circuit is interrupted according to the RESIDUAL operation, which results in lesser magnetization imposed on the workpiece, and it tends to assume its original shape. A second operation is then performed thereon, and after that is done, the circuit is again put through the RESIDUAL cycling, and the chuck magnetized at a still lesser level. Another working operation is performed on the workpiece. At each step the workpiece assumes a condition closer to its original undistorted condition, and the working operation thereon is lighter, e.g., the grinding or cutting operation is shallower. In this series of operations, it is desired not to remove the workpiece from the chuck, so as to eliminate the possibility of foreign matter coming between the workpiece and the chuck, which would disturb its original position thereon.

FIG. 7 indicates such a condition wherein a workpiece 208 is held on a chuck. This feature of the invention is disclosed and claimed in my co-pending and divisional application Ser. No. 661,642 filed Aug. 18, 1967. This figure is greatly exaggerated for more clearly bringing out the feature involved. In position A the chuck is de-energized, and the workpiece 208 thereon is in its normal condition, having an upper convex surface 210a and an under concave surface 210b.

In position B the chuck and the workpiece are magnetized, and the magnetization force draws the workpiece downwardly toward a flat position. It will be understood that the actual change in position in a practical operation may be so small as to be undetectable by the naked eye, but as indicated above, the conditions and proportions indicated in these figures are many times multiplied relative to a practical operation. A grinding wheel 212 is set to grind a surface on the workpiece represented by the dot-dash line 214, which is flat, in the condition of the workpiece when it is held in its relatively flattened position.

When the chuck and workpiece are thereafter demagnetized, the workpiece tends to re-assume its original condition, as indicated in position C, and here it will be observed that the outer surface 210a is again arcuate. However, the surface of the workpiece which was once flat in position B where the workpiece was relatively flattened, is now again curved. Thus, a flat surface in this step is not attained on the workpiece in its normal condition because of the distortion of the workpiece in the holding operation, and the resumption of its original shape when the magnetization is removed.

The central portion of the workpiece after the grinding operation, as indicated at 212a (position C), is thinner than the end portions indicated at 212b. This condition is obviated in a succession of grinding operations of the kind just described, but with the workpiece held by progressively lesser forces, i.e., each time the chuck and workpiece are magnetized, they are so magnetized to a lesser degree so that the distortion of the workpiece is progressively less in the successive steps. In this same series of operation, successively shallower cuts are taken, and because of the less force thus applied, it is unnecessary to utilize so great magnetization power to hold the workpiece. Such series of progressively lesser demagnetization and shallower cuts are continued until, in the final step, the distortion is at a minimum, and from a practical standpoint subtantially eliminated, whereby the surface that is flat when the final light magnetization is applied, remains substantially flat after the magnetization force is removed.

The same kind of operation can be performed on the opposite side of the workpiece, as indicated in positions D and E of FIG. 7. In position D the same workpiece is placed on the chuck with the convex side down; in this case also, when the chuck is magnetized, as indicated in position E, the workpiece is flattened. When the grinding operation is performed for producing a flat surface at the line 214, the same kind of result is obtained as described above. In a series of progressively decreased magnetization, and shallower cuts, the concave side of the workpiece can be provided with a flat surface in the same manner as on the convex side, described above. Position F illustrates a workpiece 208 in which the convex and concave portions have been ground in the manner above described, these latter portions being indicated by the dotted lines, resulting in a workpiece as indicated in full lines that has flat surfaces on both sides.

Although in FIG. 2 there are two chucks illustrated, it will be understood that the apparatus is effective in connection with any other number of chucks, including a single chuck, or a greater number thereof. The invention is also effective for individually controlling a plurality of chucks. For example, switches I1 and J1 are provided in the conductors 56a and 56b, respectively, controlled by respective relay coils I and J, which in turn are controlled by manually controlled switches 218a and 218b, related to the respective chucks 24a and 24b. A similar arrangement may be provided for accommodating any desired number of chucks.

While I have herein shown and described certain preferred embodiments of the invention, it will be understood that changes may be made in the scope of the appended claims.

I claim:

1. Apparatus of the character disclosed for magnetizing and demagnetizing a permanent magnet chuck, comprising, in combination, circuit means for transmitting direct current to the chuck, control means for establishing said circuit means and thereby energizing the chuck, means disconnecting said chuck pursuant to the chuck reaching a pre-determined saturation level, means for re-establishing said circuit means and reversing the polarity of the direct current through the chuck, means in said circuit means responsive to current therein for producing a control signal, means responsive to said control signal for interrupting said circuit means and thereby disconnecting the chuck, adjusting means for rendering said interrupting means operative, through said control signal, in response to decrease of the saturation level of the chuck to a selected lower level, means shunting said control signal producing means, means for opening said shunting means in conjunction with reversing the polarity of the direct current in the chuck, and cycling means for demagnetizing the chuck in a plurality of steps in a pre-determined cycle.

2. The invention set out in claim 1, wherein said interrupting means includes tube control relay means, and said control signal operates to trigger the tube.

3. The invention set out in claim 1, wherein said adjusting means is operative for controlling the tube upon the development of an effective signal upon the magnetization of the chuck reaching a selected level.

4. Apparatus of the character disclosed for magnetizing and demagnetizing a permanent magnet chuck comprising in combination, circuit means for transmitting direct current to the chuck, control-cycling means for establishing said circuit means and thereby energizing the chuck and for disconnecting the chuck after the chuck reaches full saturation, said control-cycling means being operative for producing reverse D.C. through the chuck in a demagnetizing operation, means responsive to the reverse D.C. for producing a control signal, means responsive to said control signal for interrupting the circuit means and thereby disconnecting said chuck, adjusting means for rendering said interrupting means operative through said control signal in response to decrease of the saturation of the chuck to a selected lower level, and means operated by said control-cycling means for demagnetizing the chuck in a series of steps of alternately reversing the D.C. to the chuck.

5. The invention set out in claim 4, wherein said control-cycling means includes motor driven switching means, means including limit switches is provided for controlling the drive of the switch means through a series of steps for producing alternately reverse D.C. on the chuck and for controlling the positioning of the motor and switch means selectively to ON and OFF positions, and in ON positions selectively to positions in which the D.C. impressed on the chuck is respectively reversed.

6. The invention set out in claim 1 wherein permanent magnet relay means is connected in the D.C. circuit to the chuck for operating a signal light, remaining in energized and de-energized conditions respectively with those conditions of the chuck.

7. The invention set out in claim 6 wherein means is provided for energizing the chuck selectively to different levels of magnetization in an energizing operation, and the permanent magnet relay means becomes operatively energized with the chuck, regardless of the level of magnetization to which the chuck is energized in such energizing operation.

8. Apparatus of the character disclosed for magnetizing and demagnetizing a permanent magnet chuck comprising in combination, A.C. circuit means, rectifier means for converting the A.C. to D.C., circuit means for transmitting the D.C. to the chuck, cycling means operating through a pre-determined cycle for controlling said A.C. and D.C. circuit means and operative for closing the circuit means to the chuck and thereby energizing the chuck, and thereafter in the same cycle opening the circuit means to the chuck, and demagnetizing means controlled by said cycling means for demagnetizing the chuck in a series of steps to a level of saturation near zero.

9. The invention set out in claim 8 wherein manually controlled adjusting means is provided which acts through the A.C. circuit for adjustably controlling the voltage of the current applied to the chuck.

10. Apparatus of the character disclosed for magnetizing and demagnetizing a permanent magnet chuck, comprising, in combination, circuit means for transmitting direct current to the chuck, control means including a motor and switch means driven thereby, said switch means having ON and OFF positions and having successive ON positions in which direct current, in respectively opposite directions, is transmitted to the chuck, said control means including means responsive to a manual manipulation for energizing the chuck to a pre-determined level and for interrupting circuit to the chuck after energization thereof, means controlled by said control means and operative through a pre-determined cycle for demagnetizing the chuck in a plurality of steps to a level of magnetization near zero, means controlled by said motor and switch means responsive to a manual manipulation for energizing said chuck to a level of magnetization less than said pre-determined level and interrupting circuit to the chuck upon energization thereof to such lesser level, and manually adjustable means controlling said last-named means for pre-determining said lesser level of magnetization.

11. The invention set out in claim 10, wherein said control means is operative for producing reverse D.C. constantly through the chuck, and means is provided for producing a signal by said reverse D.C., and additional means is provided responsive to such signal and operative for interrupting circuit to the chuck in response to the magnetization thereof diminishing to a pre-determined level.

12. Apparatus of the character disclosed for magnetizing and demagnetizing a permanent magnet chuck, comprising, in combination, A.C. circuit means, means for converting the A.C. to D.C., D.C. circuit means for transmitting the D.C. to the chuck, a motor and switch means driven thereby for controlling the circuit means, a MAGNETIZING circuit operative for controlling said motor and switch means for turning on circuit to the chuck and magnetizing the same, and thereafter interrupting circuit to the chuck upon the chuck reaching full magnetization, a VARIABLE circuit including manually adjustable means controlling said motor driven switch means for magnetizing the chuck according to the setting of the said manual adjustable means, a RESIDUAL circuit controlling said motor-driven switch means for producing a constant reverse direct current through the chuck, control means responsive to a signal produced by the reverse direct current for interrupting circuit to the chuck at a predetermined and low level of magnetization of the chuck, and a DEMAGNETIZING circuit for controlling said motor-driven switches for demagnetizing the chuck in a series of steps in which the D.C. is alternately reversed through the chuck and reduced in value to bring the magnetization of the chuck to a level near zero.

13. The invention set out in claim 12 wherein said variable circuit is operative for controlling said motor and switch means, in response to adjustment of said manually adjustable means, to increase the level of magnetization of the chuck from any given level thereof, and further, operative for opening circuit to the chuck in response to the magnetization of the chuck reaching such predetermined higher level.

14. Apparatus of the character disclosed for controlling the magnetization and demagnetization of a permanent magnet chuck, comprising, in combination, an A.C. circuit, including transformer means, rectifier means for converting A.C. to D.C., a D.C. circuit for transmitting the D.C. to the chuck, manually quick-setting effectively infinitely variable means for pre-determining the value of the voltage impressed on the chuck, and demagnetizing means for demagnetizing the chuck in a series of steps and operative for reversing the polarity of the D.C. impressed on the chuck in successive ones of said steps and diminishing the voltage impressed on the chuck at each step, said steps being predetermined in number notwithstanding the value of the voltage as controlled by said manually controllable means.

15. The invention set out in claim 14 and including control means operative for interrupting the circuit to the chuck after magnetization thereof, and operative for impressing constant reverse D.C. thereon, means responsive to said reverse D.C. for producing a control signal, and means controlled by such control signal for interrupting circuit to the chuck, said signal producing means being adjustable selectively for producing an effective signal at any desired level of magnetization of the chuck.

16. The invention set out in claim 1 and including means for producing constant reverse D.C. in the chuck, means for producing a signal in response to such reverse D.C., control means responsive to such signal for interrupting circuit to said chuck, second control means responsive to said signal for interrupting circuit to the chuck, and manually controllable and adjustable means for establishing an effective signal at any desired level of magnetism of the chuck for controlling the actuation of the second control means.

17. The invention set out in claim 16 and including manually adjustable means for controlling the operating range of the second control means in response to a predetermined signal within an effective range of operation of the first control means.

18. The invention set out in claim 16 wherein the first control means, so long as it is in energized condition, controls the energized condition of the second control means.

19. The invention set out in claim 1 wherein a plurality of chucks is provided, and the control means set out is operative for controlling all of said chucks.

20. The invention set out in claim 19 wherein switch means is provided for selectively connecting the chucks individually to said control means.

References Cited
UNITED STATES PATENTS

| | | | |
|---|---|---|---|
| 2,825,854 | 3/1958 | Littwin | 317—123 XR |
| 3,034,021 | 5/1962 | Callihan | 317—123 |
| 3,036,245 | 5/1962 | Fourey | 317—123 |
| 3,164,753 | 1/1965 | Schroeder | 317—123 |
| 3,209,891 | 10/1965 | Littwin | 317—157.5 XR |
| 3,218,522 | 11/1965 | Littwin | 317—157.5 |

LEE T. HIX, *Primary Examiner.*